United States Patent [19]

Weber et al.

[11] Patent Number: 5,237,660
[45] Date of Patent: Aug. 17, 1993

[54] CONTROL METHOD AND APPARATUS FOR CONTROLLING THE DATA FLOW RATE IN A FIFO MEMORY, FOR SYNCHRONOUS SCSI DATA TRANSFERS

[75] Inventors: Bret S. Weber; James R. Reif; Timothy E. Hoglund, all of Wichita, Kans.

[73] Assignee: NCR Corporation, Dayton, Ohio

[21] Appl. No.: 289,859

[22] Filed: Dec. 27, 1988

[51] Int. Cl.$^5$ .............................................. G06F 5/06
[52] U.S. Cl. .................................. 395/250; 364/239; 364/239.1; 364/239.51; 364/240; 364/240.9; 364/242.3; 364/242.6; 364/242.92; 364/DIG. 1; 364/939; 364/939.4; 364/940.71; 364/937; 364/935.4; 364/935.41; 364/DIG. 2
[58] Field of Search .............................. 395/200, 250; 364/DIG. 1, DIG. 2

[56] References Cited

U.S. PATENT DOCUMENTS

| | | | |
|---|---|---|---|
| 3,968,478 | 7/1976 | Meusch, Jr. | 340/172.5 |
| 4,028,666 | 6/1977 | Suzuki et al. | 340/172.5 |
| 4,152,762 | 5/1979 | Bird et al. | 364/200 |
| 4,210,959 | 7/1980 | Wozniak | 364/200 |
| 4,393,464 | 7/1983 | Knapp et al. | 364/900 |
| 4,449,202 | 5/1984 | Knapp et al. | 364/900 |
| 4,454,595 | 6/1984 | Cage | 364/900 |
| 4,536,872 | 8/1985 | Lahti | 370/82 |
| 4,692,894 | 9/1987 | Bemis | 364/900 |

*Primary Examiner*—Thomas C. Lee
*Assistant Examiner*—Maria N. Von Buhr
*Attorney, Agent, or Firm*—Jack R. Penrod

[57] ABSTRACT

A circuit for use with a SCSI interface for controlling synchronous data transfers into an attached FIFO memory. The circuit uses a comparator to keep track of the number of FIFO locations available by starting with a threshold value, which represents the locations available initially, and comparing the net number of FIFO locations filled to the threshold value. The net number of FIFO locations filled is kept by a counter which counts the difference between the words transferred into the FIFO and the words transferred out of the FIFO. The threshold value is an adjusted offset value if the SCSI interface is operating in INITIATOR mode, and the FIFO size if the SCSI interface is operating in TARGET mode. When the comparator determines that the FIFO is filled, it pauses the current synchronous message by withholding an ACK in the INITIATOR mode or a REQ in the TARGET mode.

5 Claims, 1 Drawing Sheet

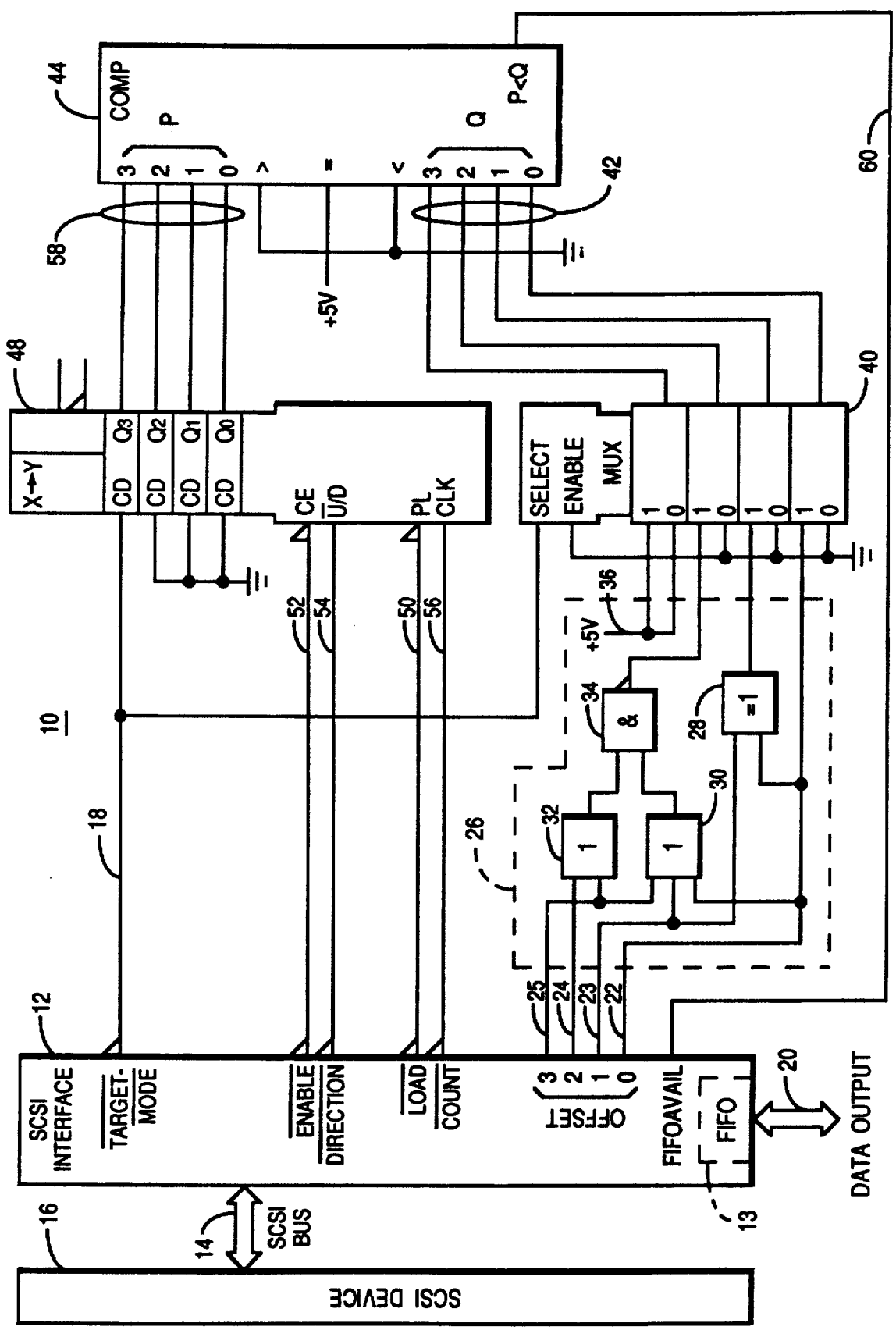

CONTROL METHOD AND APPARATUS FOR CONTROLLING THE DATA FLOW RATE IN A FIFO MEMORY, FOR SYNCHRONOUS SCSI DATA TRANSFERS

BACKGROUND OF THE INVENTION

The present invention relates to a small computer system interface (SCSI) of a system or subsystem device, and more particularly to a control method and apparatus for a synchronous SCSI data transfer according to the synchronous option of SCSI Standard ANSI X3.131-1986.

The SCSI standard, ANSI X.3.131-1986, defines a standard interface that is used in small computers having SCSI buses, and the disclosure of ANSI X.3.131-1986 is hereby incorporated by reference. Each device having a SCSI interface may operate as a TARGET device, an INITIATOR device, or a unit not involved in the present transfer depending upon the system programming. While each device is typically either a TARGET or an INITIATOR within the system, the SCSI standard does permit a given device to be a TARGET during some operations and an INITIATOR during others. Thus, to be completely flexible, an interface should have the capability to be redefinable as a TARGET or an INITIATOR.

Additionally, the SCSI standard defines and describes an optional synchronous data transfer mode and an optional synchronous data transfer protocol. The synchronous data transfer mode and protocol provide for an increase of data transfer rates across the SCSI bus during a data phase operation. During each synchronous data transfer operation, the two devices which have elected to take part in the transfer use a previously negotiated pacing factor that is defined as a REQUEST/ACKNOWLEDGE (REQ/ACK) offset.

The synchronous data transfer protocol defines two operation modes: the TARGET to INITIATOR data transfer mode (TARGET mode), and the INITIATOR to TARGET data transfer mode (INITIATOR mode).

For a TARGET mode data transfer, the TARGET device transmits one byte of data across the SCSI bus for each REQUEST pulse (REQ) that it transmits. During TARGET mode, the TARGET device may continue to transmit REQs and data bytes onto the SCSI bus until the difference between the number of REQs transmitted and the number of ACKNOWLEDGE pulses (ACKs) received is less than or equal to the REQ/ACK offset previously negotiated. The REQ/ACK offset represents the maximum number of REQs and corresponding bytes which a TARGET device may send before any corresponding ACKs are received from the INITIATOR device. As long as the TARGET device does not transmit data more rapidly than the INITIATOR can process and/or store, the synchronous data transfer to the INITIATOR is successfully completed.

During INITIATOR mode, the INITIATOR receives one or more REQs from its TARGET and begins to transmit a word of data across the SCSI bus for each REQ received. The INITIATOR transmits an ACK with each byte it transmits onto the SCSI bus. In this type of synchronous data transfer, the INITIATOR device may continue to transmit ACKs and data bytes until the difference between the number of REQs received from the TARGET device and the number of ACKs transmitted from the INITIATOR is equal to zero. As long as the TARGET device does not request by REQs more data bytes than it can process and/or store, the synchronous data transfer to the TARGET is successfully completed.

A problem arises, however, when a SCSI device receiving synchronous data starts to receive and process a synchronous data word which exceeds its joint capability to dynamically process and output data and temporarily store any backlog. A common example of this problem is a SCSI controller for a mass storage device, such as a SCSI disk drive, interfacing to a slower system channel, such as a DMA channel. In such a case, the SCSI controller receives the data from the SCSI disk drive and retransmits the data onto the slower speed system channel. For such a device, the capacity of the FIFO memory serves as a buffer until the FIFO memory is filled. After the FIFO memory is filled, however, the synchronous data being transferred must be paused by inserting wait states in the synchronous data transmission to prevent the loss of data by an overflow condition.

It is an object of this invention to provide a method for preventing the overflow of a FIFO memory storing synchronous data received by a SCSI device.

It is another object of this invention to provide an apparatus for preventing the overflow of a FIFO memory for storing synchronous data received by a SCSI device.

SUMMARY OF THE INVENTION

Briefly stated, in accordance with one aspect of the invention, the foregoing objects are achieved by providing a method for controlling a data transfer to a FIFO memory of a SCSI device. The method includes the steps of selecting a first threshold value and a second threshold value, and inputting these threshold values to two respective input ports of a multiplexer. The multiplexer switchably selects one of the threshold values as its output value. The method also includes counting a difference between the number of bytes received into the FIFO memory and the number of bytes transmitted out of the FIFO memory with an up/down counter and outputting the difference as an output value thereof. A comparison is made between the output value of the multiplexer and said output value of said up/down counter, and the data transfer to the FIFO memory is enabled if the output value of the up/down counter is less than the output value of the multiplexer. The multiplexer is controlled to select the first threshold value if the SCSI device is a TARGET, and the second threshold value if the SCSI device is an INITIATOR.

In accordance with another aspect of the invention, the aforementioned objects are achieved by providing an apparatus for controlling a data transfer into a FIFO memory of a SCSI device, including a first threshold device for outputting a first threshold value, a second threshold device for outputting a second threshold value, a switch device connected to the first and second threshold devices for switchably selecting between them to provide an output value of the switch device. Further, the apparatus includes a backlog counter device for counting a difference between a number of bytes received into the FIFO and a number of bytes transmitted out of the FIFO, and for outputting this difference as an output value. A comparator is connected to the switch device and also to the backlog counter device for comparing their respective output values and enabling the data transfer if the value of the difference is less than the output value of the switch device. The switch device is controlled to select the first threshold value if the SCSI device is a TARGET and the second threshold value if the SCSI device is an INITIATOR.

BRIEF DESCRIPTION OF THE DRAWING

While the specification concludes with the appended claims particularly pointing out and distinctly claiming the subject matter which is regarded as the invention, it is believed that the invention will be better understood from the following detailed description of the illustrative embodiment taken in conjunction with the accompanying drawing in which the FIGURE is a logic diagram of one embodiment of the invention.

DETAILED DESCRIPTION OF A PREFERRED EMBODIMENT

Referring to the Figure, there is shown a logic diagram of one embodiment of a control apparatus 10 for controlling a SCSI interface 12. The SCSI interface 12 has a FIFO 13 as a part thereof. The control apparatus 10 may be either a part of the SCSI interface 12 with which it interconnects, or an external circuit. In the preferred embodiment, the control apparatus 10 is located on the same integrated circuit substrate as the SCSI interface 12.

The SCSI interface 12 is connected by a SCSI bus 14 to another SCSI device 16. In operation, the SCSI interface 12 and the SCSI device 16 set up a relationship between each other for the purpose of transferring synchronous data. This set up determines an output signal level of a $\overline{\text{TARGETMODE}}$ signal on a line 18. If the SCSI interface 12 is a SCSI TARGET, then the output $\overline{\text{TARGETMODE}}$ signal is a LOW logic level. Conversely, if the SCSI interface 12 is a SCSI INITIATOR, then the output $\overline{\text{TARGETMODE}}$ signal is a HIGH logic level. If the relationship between the SCSI interface 12 and another SCSI unit, such as SCSI device 16, changes then the output $\overline{\text{TARGETMODE}}$ signal on line 18 would change accordingly.

When the SCSI interface 12 is set up as a SCSI INITIATOR for receiving synchronous data, it negotiates for a REQ/ACK offset value with its SCSI TARGET, such as SCSI device 16, which transmits the synchronous data. The REQ/ACK offset value is a number that is equal to the maximum number of REQs sent by a SCSI TARGET, which is essentially the same as the number of data bytes transmitted by the SCSI TARGET, before a SCSI INITIATOR, such as the SCSI interface 12, returns an ACK across the SCSI bus 14. Thus, the REQs and the ACKs form a protocol to provide control for the synchronous data transfers between a SCSI INITIATOR and a SCSI TARGET.

Control of the synchronous data transfer is important for multi-byte transfers because of the previously mentioned danger of overflow at the receiving unit if some sort of control is not provided. The danger from overflow is greatest when the transfer rate of the SCSI bus 14 into the SCSI interface 12 exceeds the rate of transfer out onto data output bus 20. In the preferred embodiment, the data output bus 20 is a DMA bus which transmits data as a direct memory access unit and receives a cycle-complete signal for each DMA cycle completed. An overflow may occur because the DMA bus is slower inherently, or because the DMA bus is currently busy with other transactions. Those skilled in the art will recognize that with variations any bus which sends an acknowledge signal for each data word received could be adapted for use with the present invention, and all such variations are deemed to be part of the present invention.

The negotiated REQ/ACK offset for the SCSI interface 12 is stored as a four bit, digital representation, and is connected by lines 22, 23, 24, and 25 as a four bit input to a logic network 26. The logic network 26 performs a logical addition and subtraction operation in order to provide an adjusted threshold value, as will be explained below. The four bit output of the logic network 26 is connected to a set of four inputs of a quad two-to-one multiplexer 40, such as a type 74F157 by Fairchild Camera and Instrument Corp. These four bits are the selected inputs of the multiplexer 40 whenever the control input, SELECT, is driven to a HIGH logic level.

The logic network 26 includes Exclusive OR 28, three-input OR gate 30, two-input OR gate 32, and two input NAND 34. The lowest significant bit of the REQ/ACK offset value, is connected to the logic network 26 on line 22, and is conducted directly through the logic network 26 to an input of the least significant position of the quad two-to-one multiplexer 40. The Exclusive OR gate 28 is connected at its inputs to the two least significant bits of the REQ/ACK offset value by lines 22 and 23. The output of the Exclusive OR gate 28 is connected to one input of the second least significant position of the multiplexer 40. The OR gate 30 has its three inputs connected to the two least significant bits of the REQ/ACK offset value by lines 22, 23 and to the most significant bit of the REQ/ACK offset value by line 25. The output of OR gate 30 is connected to one input of NAND gate 34. The OR gate 32 has its two inputs connected to the two most significant bits of the REQ/ACK offset value by lines 24, 25. The output of the OR gate 32 is connected to a second of two inputs to the NAND gate 34. The output of the NAND gate 34 is connected as an input to the second most significant position of the multiplexer 40. Line 36 of logic network 26 is a direct connection from +5V to the input of the most significant position of the multiplexer 40. The logic network 26 as shown logically performs the addition and subtraction operations for the INITIATOR mode adjusted threshold, which equals:

$$(\text{FIFOSIZE} - \text{OFFSET}) + 8$$

where:
FIFOSIZE is the number of words storable in the FIFO 13 and is equal to eight, and OFFSET is the REQ/ACK offset value which is between one and eight.

While the logical network 26 is shown specifically for the case of an eight word FIFO and a REQ/ACK offset range of one to eight, those skilled in the art will recognize that other variations modifications are possible, and the invention is not deemed to be limited to the shown example only, but to also include all such variations and modifications.

The other set of inputs to multiplexer 40 are all directly tied to fixed logic levels. This set of inputs is selected whenever the control input, SELECT, is driven to a LOW logic level. The three least significant input positions are connected directly to fixed LOW logic levels and the most significant input position is connected directly to a fixed HIGH logic level. These inputs represent the TARGET mode threshold which will be explained below.

The four outputs of the quad two-to-one multiplexer 40 are connected to one set of inputs of a digital comparator 44 by four bit bus 42. The ENABLE input of the quad two-to-one multiplexer 40 is connected to a fixed LOW logic level, thereby making the selection of the multiplexer inputs solely the function of the signal level on the SELECT input. This SELECT input is connected to line 18 which is further connected to the $\overline{\text{TARGETMODE}}$ output of the SCSI interface 12. Thus, multiplexer 40 is controlled by the $\overline{\text{TARGETMODE}}$ signal.

Line 18 is also connected to a four bit up/down counter 48, such as a type 74F191 by Fairchild Camera and Instrument Corp. Line 18 connects to the most significant bit of a four bit preload input. The three least significant bits of the four bit preload are all connected to fixed LOW logic levels. Thus, the preload into the up/down counter 48 will be a binary eight (1000) when $\overline{\text{TARGETMODE}}$ equals a HIGH logic level, indicating INITIATOR mode, and a binary zero (0000) when $\overline{\text{TARGETMODE}}$ equals a LOW logic level, indicating TARGET mode.

The control inputs of the up/down counter 48 are connected to control outputs of the SCSI interface 12, which will be described below. A $\overline{\text{LOAD}}$ output of the SCSI interface 12 is connected to the parallel load (PL) input of the up/down counter 48 by line 50. An $\overline{\text{EN}}$ $\overline{\text{ABLE}}$ output of the SCSI interface 12 is connected to the count enable (CE) input of up/down counter 48 by line 52. A $\overline{\text{DIRECTION}}$ output of the SCSI interface 12 is connected to the up/down count control input of the up/down counter 48 by line 54. Further, a COUNT output of the SCSI interface 12 is connected to the clock (CLK) input of the up/down counter 48 by line 56. The four bit output $Q_3Q_2Q_1Q_0$ of the up/down counter 48 is connected by four line bus 58 to a second set of inputs to digital comparator 44.

The digital comparator 44, such as a type 74S85 by Texas Instruments Inc., has its greater-than and less-than inputs connected to a fixed LOW logic level, and its equivalence input connected to a fixed HIGH logic level. With its inputs connected as described, the digital comparator 44 compares the binary input from the multiplexer 40 via bus 42 with the binary input from the up/down counter 48 via bus 58. The P<Q output (FIFOAVAIL) of comparator 44 is connected by line 60 to a FIFOAVAIL input of the SCSI interface 12. If the binary input from the up/down counter 48 is less than the input from the multiplexer 40, then the P<Q output (FIFOAVAIL) is a HIGH logic level indicating that FIFO memory space is available to store at least one more word of the current data sequence (flow) being received on the SCSI bus 14. If the binary input from the up/down counter 48 is greater than or equal to the input from multiplexer 40, then the output FIFOAVAIL is a LOW logic level indicating that FIFO space is not available and a pause should be inserted in the current data sequence (flow) being received by appropriate withholding of REQs or ACKs depending upon the mode of the SCSI interface 12 as a receiving TARGET or a receiving INITIATOR, respectively.

OPERATION

As explained previously, this embodiment of the invention has two types of operation: INITIATOR mode, and TARGET mode. In either mode, various control signals are generated or retransmitted by the SCSI interface 12.

INITIATOR mode operation is assumed by an agreement between the INITIATOR, SCSI interface 12 and its TARGET, such as SCSI device 16. If the INITIATOR agrees to receive synchronous data transfers from the TARGET, the INITIATOR and the TARGET will also negotiate for an REQ/ACK offset value. The REQ/ACK offset is essentially the number of words which may be sent in a burst by the TARGET before receiving an acknowledgement from the INITIATOR. The TARGET transmits a REQ for each word of the synchronous data that it transfers onto SCSI bus 14. In the embodiment of the Figure, the SCSI interface 12 receives and processes each word directly into its FIFO 13, and then transmits an ACK to the TARGET for each word received and processed. Additionally, as soon as possible, each word is removed from the FIFO 13 and transmitted over the data output bus 20 to a DMA unit (not shown). After each word has been successfully transmitted to the DMA unit (not shown) over the data output bus 20, the SCSI interface 12 receives a cycle-complete signal (CYC/CMP) from the DMA unit (not shown). Upon receipt of a CYC/CMP, the SCSI interface 12 clears the respective memory location in FIFO 13 of the transferred word and makes that location available for reception and temporary storage of another data word from the SCSI bus 14. The control apparatus 10 receives a number of control signals from the SCSI interface 12 and transmits a single control signal, FIFOAVAIL, which signals to the SCSI interface 12 whether a location is available in the FIFO 13 for another word from the TARGET or not. If a location is not available in FIFO 13, then FIFOAVAIL from the digital comparator 44 is a LOW logic level. In response to such a LOW FIFOAVAIL, the SCSI interface 12 inhibits the output of an ACK to the TARGET across the SCSI bus 14 in order to pause the transfer of synchronous data until the SCSI interface 12, acting as the INITIATOR, is ready to receive the next portion of the data.

For the INITIATOR to be capable of receiving and storing a word, that is for FIFOAVAIL to be at a HIGH logic level, the condition may be expressed as:

$$\text{ACKs} - \text{CYC/CMPs} < \text{FIFOSIZE} - \text{OFFSET}$$

where: ACK is the number of acknowledgements sent by the INITIATOR during the current data transfer phase; CYC/CMP is the number of cycles completed by the data output bus 20 and a DMA unit attached thereto; FIFOSIZE is the total number of locations in the FIFO 13, and it is also the maximum number of REQs that may be received before a CYC/CMP is received; and OFFSET is the REQ/ACK offset value negotiated at the start of the synchronous data transfer.

Since FIFOSIZE is preselected during the design of the SCSI interface 12, it is a constant for the purposes of the mathematical expression immediately above. Similarly, once the REQ/ACK offset is negotiated and stored in the SCSI interface 12, it is constant for the remainder of the data transfer. Furthermore, the REQ/ACK offset may be preselected such that after negotiation OFFSET is always less than or equal to FIFOSIZE, thereby making a difference between them always positive. When this difference is always positive, the design of a circuit to take this difference is straightforward.

ACK and CYC/CMP, on the other hand, can and do vary. Further, since it is quite possible for CYC/CMP to be greater than ACK at some time during a synchronous data transfer into and a data output transmission out of the SCSI interface 12, the design of a circuit to take this difference must make allowances for a result which may be either negative or positive at any one time.

Since comparator circuits which accept binary inputs representing positive or negative signed numbers are difficult and expensive to realize, the present invention adjusts the previous mathematical expression by adding a constant, C, to each side:

$$ACKs - CYC/COMPs + C < FIFOSIZE - OFFSET + C$$

where: C is equal to or greater than FIFOSIZE. Because CYC/COMPs, which signify the number of words of data transferred onto the output bus out of the FIFO 13, by definition cannot exceed ACKs by more than the size of the FIFO, ACKs—CYC/COMPs+C can never be negative. In the preferred embodiment, the constant C is conveniently selected to be eight, but other values for C are also contemplated, such as any power of two, and are deemed to be part of the present invention.

In TARGET mode, data is received by the SCSI interface 12 operating as a TARGET device from the SCSI bus 14. When SCSI interface 12 operating as a TARGET device is receiving data from an INITIATOR, the REQ/ACK offset is not a factor in this type of synchronous data transfer. According to the synchronous data protocol for an INITIATOR to TARGET transfer, the number of words transferred to the TARGET cannot exceed the number of words which it has requested by issuing REQs. Thus, in TARGET mode, the SCSI interface 12 can prevent the overflow of its own FIFO 13 as long as:

$$REQs - CYC/CMPs < FIFOSIZE$$

where: REQs, CYC/CMPs, and FIFOSIZE are defined as previously.

Since in normal operation the number of REQs is always greater than or equal to the number of CYC/CMPs in a synchronous data transfer, there is no need to adjust either side of this expression to keep it positive. In TARGET mode then, the implementation of the overflow control expression does not require an addition and subtraction network. The up/down counter 48 may be preloaded with binary zero (0000) and then essentially count up for each REQ transmitted by the SCSI interface 12 and down for each CYC/CMP received via the data output bus 20. The multiplexer 40 inputs selected when then $\overline{TARGETMODE}$ is at a LOW level is hardwired to the maximum number of memory locations available of its FIFO 13. The maximum number shown in the embodiment of the Figure is binary eight (1000), but the invention is not deemed to be so limited and other sizes of FIFO memory locations are contemplated. Thus, the SCSI interface 12 while receiving in TARGET mode may transmit REQs onto the SCSI bus 14 to the INITIATOR, such as SCSI device 16, until the output from the up/down counter 48 is less than the output of the multiplexer 40 as determined by the comparator 44.

The up/down counter 48 operates as a standard 74F191 and is controlled by SCSI interface 12 over lines 50,52,54, and 56 respectively connected to the parallel load input (PL), the count enable input (CE), up/down control input (U/D) and the clock (CLK) input thereof. These up/down counter inputs are respectively driven by the $\overline{LOAD}$, $\overline{ENABLE}$, $\overline{DIRECTION}$ and $\overline{COUNT}$ output of SCSI interface 12. The $\overline{LOAD}$ output is pulsed to a LOW level as soon as $\overline{TARGETMODE}$ is set up for the current data transfer. This loads in either the binary eight or binary zero depending on the TARGET/INITIATOR status. The $\overline{ENABLE}$ output is a variation of an Exclusive OR function. The $\overline{ENABLE}$ output is asserted, i.e. the count is enabled to change, whenever a REQ, an ACK or a CYC/CMP occurs by itself, but if a CYC/CMP occurs concurrently with either a REQ or an ACK the $\overline{ENABLE}$ output is not-asserted and the count of up/down counter 48 is not-enabled to change. The $\overline{DIRECTION}$ output goes to a LOW level, i.e. count up direction, whenever a REQ or an ACK is received by the SCSI interface 12, and goes to a HIGH level, i.e. count down direction, whenever a CYC/CMP is received. The $\overline{DIRECTION}$ output when either a REQ or an ACK occurs concurrently with a CYC/CMP is a 'don't care' condition for the either an up or a down count is not-enabled because of the state of the $\overline{ENABLE}$ output as explained above. The $\overline{COUNT}$ output is an OR function and sends a count/clock pulse to the CLK input of the up/down counter 48 for every occurrence of a REQ, an ACK, and/or a CYC/CMP received by the SCSI interface 12. Each count/clock pulse causes the up/down counter 48 to increment or decrement the count according to the $\overline{DIRECTION}$ output if-and-only-if the $\overline{ENABLE}$ output is asserted to enable the count. It will be appreciated that these outputs may be generated independently of the TARGET/INITIATOR mode setting of the SCSI interface 12, and still control the control apparatus 10 correctly and prevent the overflow of the FIFO 13 that is receiving the current synchronous data.

Thus, it will now be understood that there has been disclosed a control method and apparatus for a synchronous SCSI data transfer which prevents the overflow of data while maximizing the data transfer rate of the SCSI bus. While the invention has been particularly illustrated and described with reference to a preferred embodiment thereof, it will be understood by those skilled in the art that various changes in form, details, and applications may be made therein, such as other FIFO sizes and other REQ/ACK offset values. It is accordingly intended that the appended claims shall cover all such changes in form, details and applications which do not depart from the true spirit and scope of the invention.

What is claimed as new and desired to be secured by Letters Patent of the United States is:

1. An apparatus for controlling a data transfer into a FIFO memory of a SCSI device, comprising:
   first threshold means for outputting a first threshold value;
   second threshold means for outputting a second threshold value;
   switch means connected to said first and second threshold means for switchably selecting one of said threshold values as an output value thereof;

counter means for counting a difference value between a number of types received into the FIFO and a number of bytes transmitted out of the FIFO, and outputting said difference as an output value thereof;

comparator connected to said switch means and to said counter means for comparing their respective output values and enabling the data transfer if said difference value is less than said output value of said switch means;

control means for selecting said second threshold value as said output value of said switch means whenever the SCSI device into which the data is being transferred is an INITIATOR device and for selecting a preset value from which the counting of said counter means initiates;

said second threshold value is sixteen less an offset value;

said preset value is eight; and said offset value is determined by a previous SCSI arbitration between said INITIATOR and a TARGET for the data transfer.

2. A method for controlling a data transfer to a FIFO memory of a SCSI device, comprising the steps of:

selecting a first threshold value;

arbitrating between a SCSI INITIATOR and a SCSI TARGET to determine a second threshold value;

inputting said first threshold value to a first input port of a multiplexer;

inputting said second threshold value to a second input port of a multiplexer;

switchably selecting one of said threshold values as an output value of said multiplexer;

counting a difference between a number of bytes received into the FIFO memory and a number of bytes transmitted out of the FIFO memory and outputting said difference as an output value of an up/down counter;

comparing said output value of said multiplexer and said output value of said up/down counter; and enabling the data transfer to the FIFO memory if said output value of said up/down counter is less than said output value of said multiplexer.

3. The method according to claim 2, wherein:
said first threshold value is selected to be zero; and
said first threshold value is switchably selected during an INITIATOR-to-TARGET data transfer.

4. The method according to claim 2, wherein:
said second threshold value that is determined during said arbitrating step is an offset value; and
said second threshold value is switchably selected during a TARGET-to-INITIATOR data transfer.

5. The method according to claim 2, wherein:
said second threshold value that is determined during said arbitrating step is an offset value of eight; and
said second threshold value is switchably selected during a TARGET-to-INITIATOR data transfer.

* * * * *

UNITED STATES PATENT AND TRADEMARK OFFICE
CERTIFICATE OF CORRECTION

PATENT NO. : 5,237,660
DATED : August 17, 1993
INVENTOR(S) : Bret S. Weber, et al.

It is certified that error appears in the above-indentified patent and that said Letters Patent is hereby corrected as shown below:

Column 9, line 2, delete "types" and substitute --bytes--.

Signed and Sealed this

Twenty-third Day of August, 1994

Attest:

BRUCE LEHMAN

Attesting Officer

Commissioner of Patents and Trademarks